(12) United States Patent
Hagg

(10) Patent No.: US 8,746,163 B2
(45) Date of Patent: Jun. 10, 2014

(54) FLOATING FLUE

(76) Inventor: Franklin Hagg, Alkmaar (NL)

( * ) Notice: Subject to any disclaimer, the term of this patent is extended or adjusted under 35 U.S.C. 154(b) by 298 days.

(21) Appl. No.: 13/201,030

(22) PCT Filed: Mar. 1, 2010

(86) PCT No.: PCT/NL2010/000034
§ 371 (c)(1),
(2), (4) Date: Aug. 11, 2011

(87) PCT Pub. No.: WO2010/101456
PCT Pub. Date: Sep. 10, 2010

(65) Prior Publication Data
US 2011/0303141 A1    Dec. 15, 2011

(30) Foreign Application Priority Data
Mar. 2, 2009 (NL) .................................. 1036653

(51) Int. Cl.
*B63B 35/44* (2006.01)

(52) U.S. Cl.
USPC .............................................. 114/264; 454/1

(58) Field of Classification Search
USPC ........... 114/264, 292; 285/11; 290/43, 44, 53, 290/54, 55; 454/1, 8, 10, 15
See application file for complete search history.

(56) References Cited

U.S. PATENT DOCUMENTS

| | | | | |
|---|---|---|---|---|
| 3,489,072 A | * | 1/1970 | Secor | 454/1 |
| 3,835,625 A | * | 9/1974 | Williams | 454/1 |
| 3,974,756 A | * | 8/1976 | Long | 454/1 |
| 5,194,754 A | | 3/1993 | Mikami | |
| 5,286,063 A | * | 2/1994 | Huston | 285/11 |

FOREIGN PATENT DOCUMENTS

| | | |
|---|---|---|
| DE | 39 18 764 A1 | 1/1991 |
| DE | 40 34 968 A1 | 5/1992 |
| NL | 9 100 597 A | 11/1992 |
| WO | WO 2004/036039 A1 | 4/2004 |
| WO | WO 2008/148876 A2 | 12/2008 |

OTHER PUBLICATIONS

International Search Report, Mar. 18, 2011, from International Phase of the instant application.

\* cited by examiner

*Primary Examiner* — Lars A Olson
(74) *Attorney, Agent, or Firm* — Jackson Patent Law Office

(57) ABSTRACT

The invention relates to a light floating flue consisting of a wall of fiber-reinforced film which rotates about its axis to balance the reduced pressure in the flue with the centrifugal force on the gases in the flue and with the flue wall. The flue floats due to the friction with the rising air, the upward force of the lighter gases, optionally a zeppelin and balloon-like bodies filled with helium or hydrogen. In order to prevent bending moments on the flue, the flue is attached to the base of the tower by means of a tillable bearing.

19 Claims, 4 Drawing Sheets

FLOATING FLUE

The present invention relates to a floating flue which can carry away gases having a lower specific weight than the specific weight of the ambient air.

Known flues cannot float and are heavy, expensive and, furthermore, constructing these flues is also costly. Advertising tubes are known thin-walled floating hollow pipes which are blown upwards by a fan. These tubes are inexpensive to produce, but it requires a substantial amount of energy in order to make the tubes stand upright, due to the flow resistance of the fanned air.

The present invention does not have these drawbacks and achieves a significant cost saving due to the fact that the flue is made of thin-walled, reinforced film and the fact that it is rotated about its axial axis. The centrifugal acceleration in the flue during rotation creates a reduced pressure, as a result of which the specific weight of the gases is reduced and the gases in the flue will start to rise on account of the pressure of the ambient gases. The light, thin-walled flue is lifted by the flowing gases due to the flow resistance and stays afloat. If the flue is pulled out of alignment due to the presence of a possible wind, the rising lighter gases, following the law of Archimedes, will try to counteract this due to the upward pressure and the flue will not come to lie horizontally, but, depending on the wind speed, will be at a certain angle.

In another application of the present invention, hot gases are passed through the flue which, due to the difference in specific weight with the ambient air will automatically start to rise in the flue, as a result of which less energy is required to make the flue rotate about its axis and it is even possible to generate electrical energy by placing a gas or wind turbine in the base of the flue which is driven by the gases rising in the flue. With this application, the flue has to rotate about its axis in such a manner that the reduced pressure in the flue with the centrifugal force on the wall is equal to the outside pressure, as a result of which the thin wall retains its shape and does not implode.

In a third application of the present flue, air is sucked out of the flue at the top by means of a special floating wind turbine with hollow blades, which carries the air away to the outside as a result of the centrifugal force in the blades. Due to the suction, the air in the flue starts to rise and air will also start to flow around the base and drive a gas or wind turbine placed in the base to generate electrical energy. The advantage of this application is that the special wind turbines do not require any heavy generators or gearboxes, so that they can float more readily. With this application as well, the flue has to rotate about its axis in such a manner that the reduced pressure in the flue with the centrifugal force on the wall is equal to the outside pressure, thus enabling the thin wall to retain its shape and not implode.

In order to improve the flotation of the present invention, the latter can be suspended from a zeppelin by a cable or bodies filled with light gases (helium or hydrogen) can be placed inside or outside the flue.

Due to the fact that the flue of the present invention rotates, the air inside and outside the flue will co-rotate and generate an artificial whirlwind. Due to this effect, the flow resistance against rotation will be small and only little energy will be required to cause the flue to rotate about its axis. The thin-walled film is attached to a ring at the base of the flue. Spokes are used to attach the ring to a tiltable bearing which is fixed in the centre of the base of the flue. A rotatable and tiltable through-duct is attached to the ring and closes off the space between the base and the ring except for a gap. The gap between the base and the through-duct is closed off by a spherical labyrinth or brush sealing.

In another embodiment of the present invention, the flue is rotated about its axial axis as a result of the rising air in the flue by placing helical vanes on the inside of the wall.

The base of the flue according to the present invention is anchored on the ground and the opening has a shape which is such that the air or gases which is/are supplied or sucked in are passed into the flue with as little resistance as possible. If energy is to be generated, the base also ensures that gas or wind turbines can be placed which can convert the flow energy from the rising air into electrical energy. The base of the flue can be anchored on the ground by means of posts or by means of a deadweight. Since the flue is relatively light, it is simple to place the flue on a pontoon floating on water and to anchor the latter on the bottom of the sea or lake.

Further advantages and features of the present invention will be explained with reference to the attached figures, in which.

Figure 1:
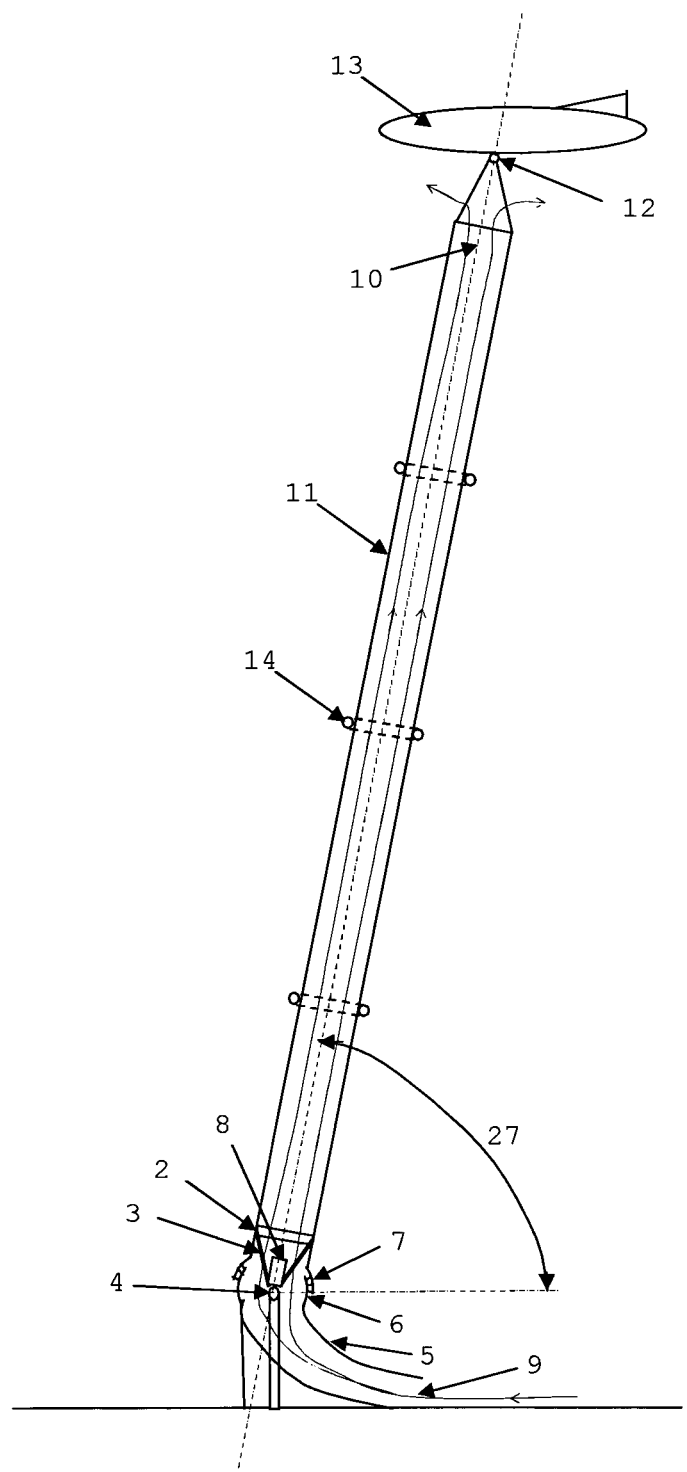
FIG. 1 shows a diagrammatic cross section of a flue according to the present invention.

FIG. 1 shows a diagrammatic cross section of the flue according to the present invention. The flue 1 is connected to a rotatable ring 2, which is connected to a tiltable bearing 4 by means of spokes 3, said tiltable bearing being attached to the centre of the base of the flue 5. On the ring 2, a rotatable and tiltable through-duct 6 is attached which is closed off by means of a spherical labyrinth or brush sealing 7. As a result of the tilting option, the base of the flue 5 cannot transfer any bending moment to the flue 1 and the latter is only loaded by an axial force. The ring 2 is driven by a motor 8 via the spokes 3 which makes it rotate axially about its axis. The flue 1 and the gas in the flue 1 rotate in the same direction as the ring 2. Due to the centrifugal force, the pressure of the gas or the air is lowered and thus the specific weight. Due to the higher outside pressure, the lighter gas will rise in the flue 1 and is displaced by the flue 1 from the inlet 9 in the base of the flue 5 to the top 10 of the flue 1. The upward movement of the gas in the flue 1 leads to friction with the thin flue wall 11, which is thus subjected to an upward force and can start to float. If there is a wind outside the flue 1, the flue 1 will tilt about the tiltable bearing 4 at a certain azimuth angle 27. Due to the tilting movement, a component of the upward force of the lighter gas in the flue 1 will act on the flue wall and the flotation of the flue 1 is improved, as a result of which the azimuth angle 27 increases.

In order to increase the buoyancy and to raise the flue 1 or take it down, the latter is connected at the top 10 to a zeppelin 13 by a likewise axially rotatable and tiltable bearing 12, which zeppelin can go up and down. For even more buoyancy, hollow balloon-like bodies 14 filled with helium or hydrogen, can be attached to the flue 1.

Figure 2:
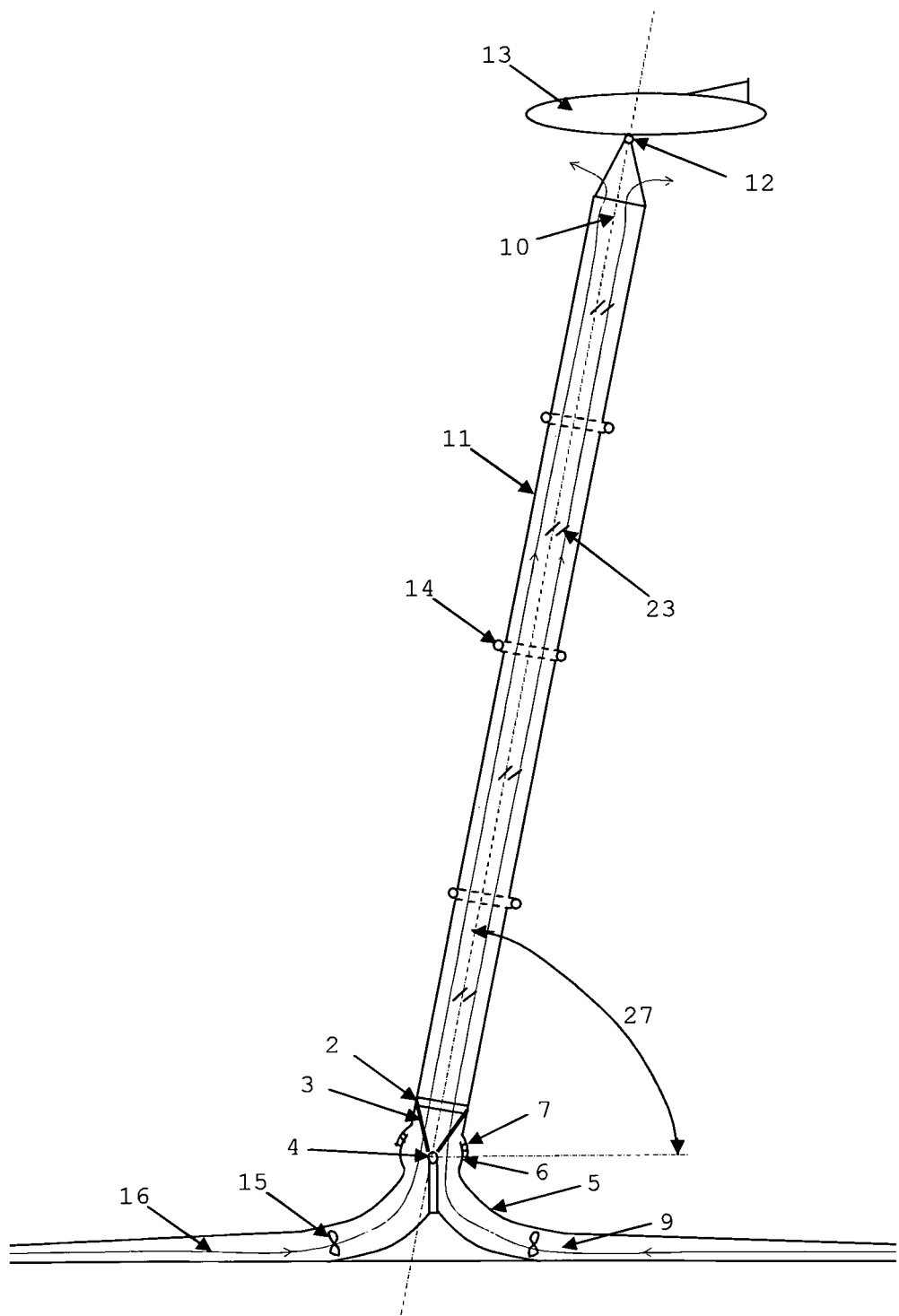
FIG. 2 shows a diagrammatic cross section of a second application of a flue according to the present invention.

FIG. 2 shows a diagrammatic cross section of a second application of a flue 1 according to the present invention. The flue 1 is connected to a rotatable ring 2 which is connected, by spokes 3, to a tiltable bearing 4 which is attached to the centre of the base of the flue 5. The ring 2 is connected to a rotatable and tiltable through-duct 6, which is closed off by a spherical labyrinth or brush sealing 7. Due to the tilting option, the base of the flue 5 cannot transfer any bending moment to the flue 1 and is only loaded by an axial force. Hot gas, which is lighter than the ambient air, is passed into the flue 1 at the inlet 9 in the base of the tower, as a result of which the gas in the flue 1 will rise. Helical vanes 23 are attached on the inside of the flue wall 11 and will start to rotate axially about the axis of the flue 1 as a result of the rising air and thus cause the flue 1 to rotate. The upward movement of the gas in the flue 1 causes friction with the thin flue wall 11 which is subjected to an upward force and will start to float. If there is a wind outside the flue 1, the flue 1 will tilt about the tiltable bearing 4 at a certain azimuth angle 27. Due to the tilting movement, a component of the upward force of the lighter gas in the flue 1 will act on the flue wall 11, as a result of which the flue 1 will assume a more vertical position.

In order to increase the buoyancy and to raise the flue 1 or to take it down, the latter is connected at the top 10 to a zeppelin 13 by an axially rotatable and tiltable bearing 12, which zeppelin can go up or down. For even more buoyancy, hollow balloon-like bodies 14, filled with helium or hydrogen, can be attached to the flue 1. In the base of the flue 5, one or more gas or wind turbines 15 are provided, which convert the kinetic energy of the rising gas into electrical energy. The rising gas in the flue 1 results in a reduced pressure. As a result of the rotation of the flue 1, the gas co-rotates and the centrifugal force on the flue wall 11 causes a pressure which is equal to the reduced pressure, so that the flue 1 does not implode. The hot gas may, for example, originate from a hothouse 16, which is heated by the sun.

Figure 3:
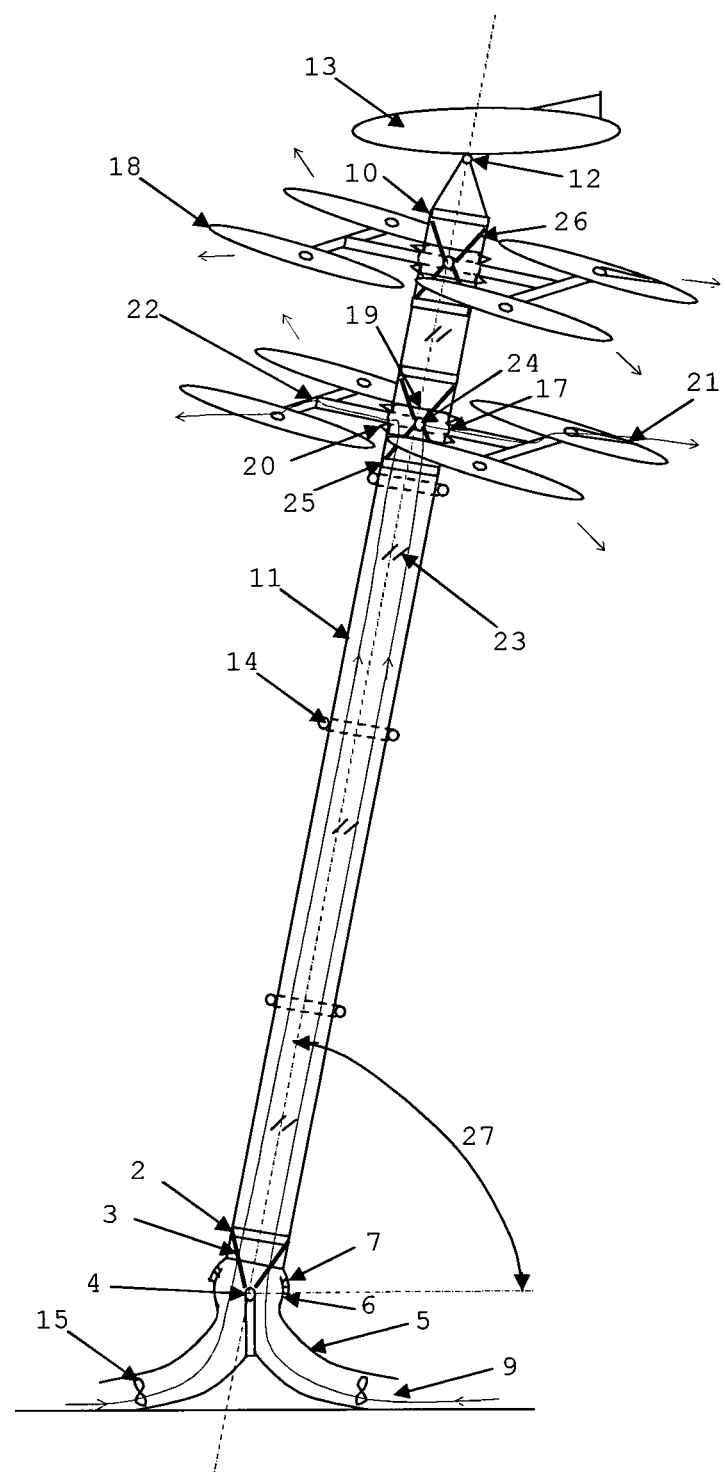
FIG. 3 shows a diagrammatic cross section of a third application of a flue according to the present invention.

FIG. 3 shows a diagrammatic cross section of a third application of a flue 1 according to the present invention. The flue 1 is connected to a rotatable ring 2 which is connected, by spokes 3, to a tiltable bearing 4 which is attached to the centre of the base of the flue 5. The ring 2 is attached to a rotatable and tiltable through-duct 6, which is closed off by a spherical labyrinth or brush sealing 7. Due to the tilting option, the base of the flue 5 cannot transfer any bending moment to the flue 1 and is only loaded by an axial force. In the flue 1, at the openings 17 in the top, air is sucked up by special floating wind turbines 18. The openings 17 are provided on a non-rotating through-duct 19, provided with bellows 20, in such a manner that the special floating wind turbines 18 can move independently of the flue 1. In FIG. 3, the turbine consists of a system of two layers, each comprising four rotors. Other configurations with regard to the number of layers and the number of rotors per layer are possible. The special floating wind turbines 18 have hollow blades 21, as a result of which the air in the blades 21 is sucked to the outside on account of the centrifugal force. As the blades 21 are in open communication with the inside of the flue 1 via a system of tubes 22, the air is sucked out of the flue 1, resulting in reduced pressure and lighter air in the flue 1 and causing the air in the flue 1 to rise.

The flue 1 is interrupted at the floating wind turbine 18. The interrupted parts of the flue 1 are mechanically connected to one another by rings 25, spokes 26 and a tiltable bearing 24. The floating wind turbine 18 is mechanically connected to the tiltable bearing 24 and thus to the flue 1 by means of the system of tubes 22. At the interruption, the flue 1 is made air-tight by the through-duct 19, which is closed off by a labyrinth or brush sealing. The openings 17 through which the system of tubes 22 runs is made air-tight by the bellows 20. The system of tubes 22 is provided on the inside of the through-duct 19 with holes so that the system of tubes 22 is in open air communication with the flue 1. Due to the tiltable bearing 24, the floating wind turbine 18 can tilt freely, so that it cannot exert a bending moment on the flue 1.

On the inside of the flue wall 11, helical vanes 23 are provided which, as a result of the rising air, start to rotate axially about the axis of the flue 1 and thus cause the flue 1 to rotate.

The upward movement of the air in the flue 1 causes friction with the thin flue wall 11 which will consequently be subjected to an upward force and start to float. If there is a wind outside the flue 1, the flue 1 will tilt about the tiltable bearing 4 at a certain azimuth angle 27. Due to the tilting movement, a component of the upward force of the lighter air in the flue 1 will act on the flue wall 11, as a result of which the flue 1 will assume a more vertical position.

In order to increase the buoyancy and to raise the flue 1 or to take it down, the latter is connected at the top 10 to a zeppelin 13 by an axially rotatable and tiltable bearing 12, which zeppelin can go up or down. For even more buoyancy, hollow balloon-like bodies 14, filled with helium or hydrogen, can be attached to the flue 1. One or more gas or wind turbines 15 are placed in the base of the flue 5, which convert the kinetic energy of the rising air into electrical energy. The air which is sucked into the flue 1 and rises therein creates a reduced pressure. As a result of the rotation of the flue 1, the gas co-rotates and the centrifugal force on the flue wall 11 causes a pressure which is equal to the reduced pressure, so that the flue 1 does not implode. With this application, the flue 1 is sealed at the top 10.

Figure 4:
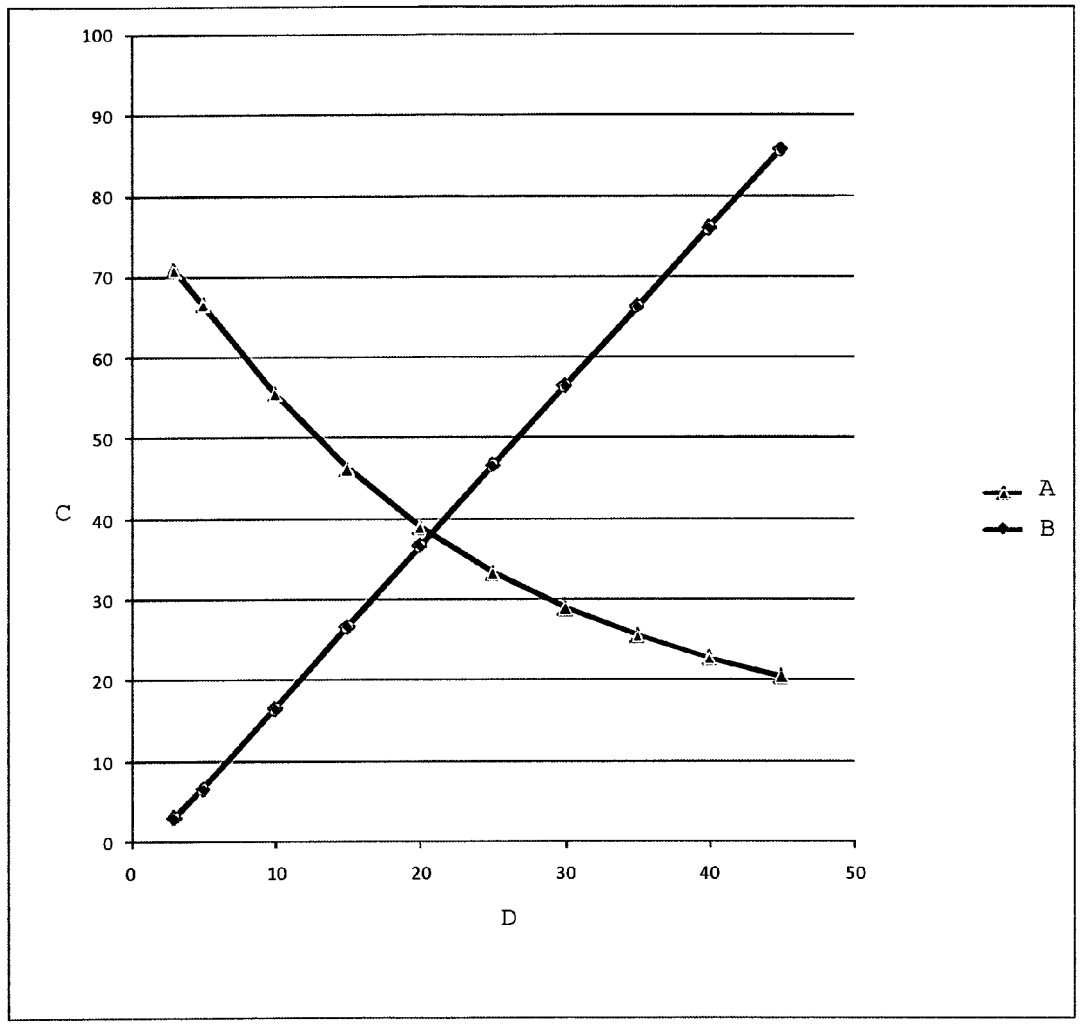
FIG. 4 shows the graph of the azimuth angle 27 of the flue according to the present invention as a function of the wind speed outside the flue.

FIG. 4 shows a graph of the azimuth angle 27 of the flue according to the present invention, as a function of the outside wind speed.

In order to determine the azimuth angle 27, the second application of the flue 1 is used by way of example, in which hot air is passed into the flue 1, thereby making it possible to generate electrical energy.

The vertical force $F_v$ on the flue 1 is determined by the difference in specific weight between the hot air in the flue 1 and the air outside the flue 1, the vertical component of the lifting force of the zeppelin 13, the friction of the rising air with the flue wall 11, the vertical component of the wind pressure outside and the weight of the flue wall 11:

$$F_v = (\pi/4)d^2 hg[(\rho_o - \rho_1)\cos\phi + 0.5 C_a \rho_o/(gh)(D/d)^2 v_w^2 \sin\phi \cos\phi - 4t/d\rho_w + \rho_i \sin\phi \lambda/(gd)v_t^2]$$

where d=flue diameter, h=flue height, g=gravity acceleration, $\rho_o$=specific weight of air outside flue 1, $\rho_i$=specific weight of air outside flue, $\phi$=azimuth angle 27, $C_a$=axial force coefficient, D=zeppelin diameter, t=wall thickness flue, $\rho_o$=specific weight of flue wall 11, $\lambda$=coefficient of friction of air with flue wall 11, $v_t$=speed of rising air and $v_w$=outside wind speed.

The horizontal force on the flue 1 is determined by the horizontal component of the outside wind pressure and of the zeppelin:

$$F_h = 0.5\rho_o v_w^2 (C_d hd \sin\phi + C_a(\pi/4)D^2 \cos^2\phi)$$

The resulting azimuth angle 27 is then:

$$\phi = \arctan(F_v/F_h)$$

Since the flue 1 cannot bear any bending moment, there is only an axial force in the flue wall from which the material stress in the flue wall can be determined:

$$\sigma = (F_v^2 + F_h^2)^{0.5}/(\pi dt)$$

In FIG. 4, for example, the dependence of the azimuth angle 27 of the flue on the outside wind speed is given as well as the stress in the material of the flue wall 11 for a flue 1 having a height of 1000 m, a diameter of 60 m, a wall thickness of 0.4 mm and which is made from carbon fibre-reinforced plastic.

In FIG. 4, the azimuth angle 27 is denoted by A and the material stress by B. The vertical axis of the graph is denoted by C, with the value of the azimuth angle 27 being given in degrees and the value of the material stress in MPa. The horizontal axis is denoted by D, with the wind speed outside being indicated in m/s.

As can clearly be seen, the flue 1 is sufficiently vertical (azimuth angle>60 degrees) at the most common wind speeds (<7 m/s) to be able to generate electrical energy.

Even at very extreme wind speeds (>40 m/s), the flue is not yet horizontal and does not touch the ground. The material stress is also still sufficiently small (<80 MPa), with the result that the flue is sufficiently strong. Incidentally, the flue 1 can be taken down and protected in a simple manner in cases of extreme weather.

The height of the flue 1 is preferably 10 to 5000 m, the diameter 0.5 to 200 m and the wall thickness 0.1 to 2 mm. The material of the flue wall 11 is preferably a fibre-reinforced plastic with an elastic matrix. For example glass fibre- or carbon fibre-reinforced (synthetic) rubber. In order to prevent moisture or ice from adhering to the wall 11, it is preferably covered with a hydrophobic layer.

The invention claimed is:

1. An assembly for rising gases, the assembly comprising:
   a bearing;
   a flue base including gas inlets;
   a flue defining a flue axis, the flue being rotatably coupled to the bearing; and
   an axially rotatable and tiltable through-duct, between the flue base and the flue, the through-duct being closed off by a labyrinth or brush sealing, in which the flue is rotated about the flue axis.

2. A Flue for making gases rise, placed on an axially rotatably and tiltably mounted ring which is placed on a base of the flue, which is provided with gas inlets and in which a space between the flue and the base of the flue is closed off by an axially rotatable and tiltable through-duct, which is closed off by a labyrinth or brush sealing, in which the flue is rotated about its axis by a motor.

3. A Flue for making gases rise, placed on an axially rotatably and tiltably mounted ring which is placed on a base of the flue, which is provided with gas inlets and in which a space between the flue and the base of the flue is closed off by an axially rotatable and tiltable through-duct, which is closed off by a labyrinth or brush sealing, in which the flue is rotated about its axis, in which hot gases are introduced into the flue and rise in the flue, the flue, on the inside of a flue wall, being provided with helical vanes which, due to rising gases, cause the flue to rotate about its axial axis.

4. A flue according to claim 3, in which floating wind turbines with open hollow blades are provided at a top of the flue by tiltable and axially rotatable bearings, which suck air out of the flue via a system of tubes, as a result of which the air in the flue starts to rise and the flue starts to rotate axially about its axis due to the helical vanes placed on an inner wall of the flue.

5. A flue according to claim 3, in which gas or wind turbines are placed in the base of the flue which convert kinetic energy of the gases rising in the flue into electrical energy.

6. A flue according to claim 3, in which hot air is supplied to the flue which has been heated by the sun in a hothouse.

7. A flue according to claim 3, in which the flue is connected at a top of the flue to a zeppelin via a tiltable and axially rotatable bearing.

8. A flue according to claim 3, in which a flue wall is connected to balloons filled with helium, hydrogen or another gas which is lighter than ambient air.

9. A flue according to claim 3, in which the base of the flue is anchored on the ground by means of posts or a deadweight.

10. A flue according to claim 3, in which the base of the flue is situated above water on a floating pontoon, the pontoon being anchored by cables and anchors.

11. An assembly according to claim 1 wherein the flue is rotated about the flue axis by a motor.

12. An assembly according to claim 1 further including helical vanes on the flue.

13. An assembly according to claim 1 further including floating wind turbines at a top of the flue.

14. An assembly according to claim 1 further including turbines in the flue base.

15. An assembly according to claim 1 wherein hot air is supplied to the flue which has been heated by the sun in a hothouse.

16. An assembly according to claim 1 wherein the flue is connected at a top of the flue to a zeppelin via a tiltable and axially rotatable bearing.

17. An assembly according to claim 1 wherein a flue wall is connected to balloons.

18. An assembly according to claim 1 wherein the base of the flue base is anchored on the ground by means of posts or a deadweight.

19. An assembly according to claim 1 wherein the flue base is situated above water on a floating pontoon.

* * * * *